US008126486B2

(12) United States Patent
Eldering et al.

(10) Patent No.: US 8,126,486 B2
(45) Date of Patent: Feb. 28, 2012

(54) ADAPTIVE ANTENNA WEIGHTING SYSTEM FOR WIRELESS LOCAL AREA AND PERSONAL AREA NETWORKS

(75) Inventors: Charles A. Eldering, Furlong, PA (US); Timothy H. Hwang, Philadelphia, PA (US)

(73) Assignee: Empire Technology Development LLC, Wilmington, DE (US)

(*) Notice: Subject to any disclaimer, the term of this patent is extended or adjusted under 35 U.S.C. 154(b) by 671 days.

(21) Appl. No.: 12/201,381

(22) Filed: Aug. 29, 2008

(65) Prior Publication Data
US 2010/0056190 A1 Mar. 4, 2010

(51) Int. Cl.
H04B 7/00 (2006.01)
H04B 7/02 (2006.01)
H04W 36/00 (2009.01)
H04W 4/00 (2009.01)
H04M 1/00 (2006.01)
H01Q 3/00 (2006.01)
G01S 3/16 (2006.01)
H04L 1/02 (2006.01)

(52) U.S. Cl. ........ 455/500; 455/442; 455/517; 455/560; 342/373; 342/378; 370/329; 370/331; 370/338; 375/267

(58) Field of Classification Search ................. 455/63.4, 455/187.1, 41.2, 436, 437, 453, 500, 517, 455/562.1, 442, 560; 342/359, 373, 377, 342/378, 380; 370/328, 329, 338, 349, 441, 370/331; 375/267
See application file for complete search history.

(56) References Cited

U.S. PATENT DOCUMENTS
5,920,286 A 7/1999 Mohebbi
(Continued)

OTHER PUBLICATIONS

Smart Antennas to expand Wi-Fi Range, accessed at <http://www.computerworld.com/mobiletopics/mobile/technology/story/0,10801,88487,00.html> on Jan. 17, 2008.

(Continued)

Primary Examiner — Andrew Wendell
Assistant Examiner — Paul P Tran
(74) Attorney, Agent, or Firm — Carlineo, Spicer & Kee, LLC

(57) ABSTRACT

A method of providing signal coverage in a wireless network includes establishing communications between a first wireless access unit and a second wireless access unit. In response to a communications device, the first wireless access unit weighting factor is modified to provide the communications device with optimal signal coverage. The first radiation weighting factor is transmitted to the second wireless access unit, which modifies its own weighting factor to provide the communications device with sufficient signal coverage.

18 Claims, 13 Drawing Sheets

U.S. PATENT DOCUMENTS

| | | | |
|---|---|---|---|
| 5,929,811 | A | 7/1999 | Rilling |
| 6,362,781 | B1 | 3/2002 | Thomas et al. |
| 6,463,303 | B1 | 10/2002 | Zhao |
| 6,611,231 | B2 | 8/2003 | Crilly et al. |
| 6,690,747 | B2 | 2/2004 | Petrus et al. |
| 6,735,445 | B2 | 5/2004 | Sharony et al. |
| 6,894,643 | B2 | 5/2005 | Guo et al. |
| 6,907,245 | B2 * | 6/2005 | Ohlsson et al. ............... 455/442 |
| 6,970,682 | B2 | 11/2005 | Crilly et al. |
| 7,099,698 | B2 | 8/2006 | Tarokh et al. |
| 7,109,919 | B2 | 9/2006 | Howell |
| 7,224,685 | B2 | 5/2007 | Proctor, Jr. |
| 7,272,408 | B2 | 9/2007 | Dalal et al. |
| 7,414,577 | B2 | 8/2008 | Mohamadi |
| 7,420,507 | B2 | 9/2008 | Thomas et al. |
| 7,426,198 | B2 * | 9/2008 | Mondal et al. ............... 370/329 |
| 7,599,714 | B2 * | 10/2009 | Kuzminskiy ............... 455/562.1 |
| 7,876,268 | B2 | 1/2011 | Jacobs |
| 2003/0013450 | A1 * | 1/2003 | Wang et al. ............... 455/442 |
| 2003/0064752 | A1 * | 4/2003 | Adachi et al. ............... 455/560 |
| 2006/0146754 | A1 * | 7/2006 | Bejerano ............... 370/332 |
| 2007/0147361 | A1 | 6/2007 | Lee |
| 2008/0014941 | A1 * | 1/2008 | Catovic et al. ............... 455/436 |
| 2008/0238688 | A1 | 10/2008 | Rofougaran et al. |
| 2010/0194629 | A1 | 8/2010 | Craig et al. |

OTHER PUBLICATIONS

Bandspeed, Inc.—Product FAQs, accessed at <http://www.bandspeed.com/support/faq.php> on Oct. 2, 2008.

Bandspeed, Inc.—AirMaestro 3100AG Virtual Controller Starter Kit, accessed at <http://www.bandspeed.com/products/3100ag_kit.php> on Oct. 2, 2008.

Getting the Most out of MIMO, accessed at <http://www.atheros.com/pt/whitepapers/MIMO_WLAN_Perf_whitepaper.pdf> on Jan. 14, 2008.

UWB Signal Sources, Antennas & Propagation, accessed at <http://www.picosecond.com/objects/AN-14a.pdf> on Jan. 14, 2008.

A Brief History of UWB Antennas, accessed at <http://www.coe.montana.edu//ee/rwolff/EE548/EE548-S06/UWB/Intro_UWBAntennas.pdf> on Jan. 14, 2008.

* cited by examiner

ADAPTIVE ANTENNA WEIGHTING SYSTEM FOR WIRELESS LOCAL AREA AND PERSONAL AREA NETWORKS

CROSS REFERENCE TO RELATED APPLICATIONS

This application is related to co-pending U.S. patent application Ser. No. 12/201,403, filed Aug. 29, 2008, entitled Method and System for Adaptive Antenna Array Pairing, and U.S. patent application Ser. No. 12/201,415, filed Aug. 29, 2008, entitled Weighting factor Adjustment in Adaptive Antenna Arrays.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

In the Drawings.

DETAILED DESCRIPTION

Figure 1:
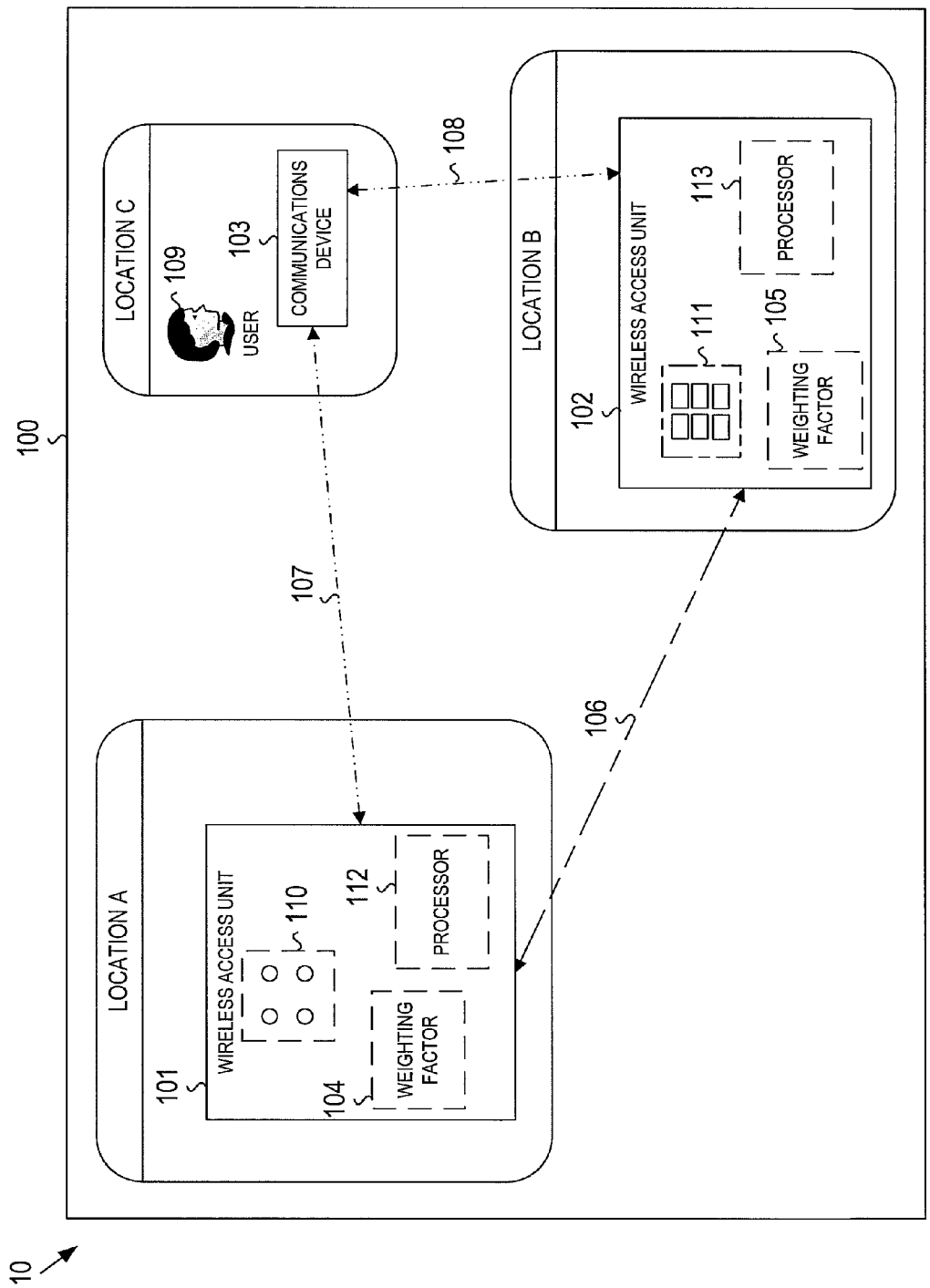
FIG. 1 is a system diagram of an adaptive antenna array system in a wireless network according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present disclosure, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

This disclosure is drawn, inter alia, to methods, apparatus, computer programs and systems related to antenna systems. Referring to FIG. 1, an adaptive antenna array system 10 for use in wireless local area networks (WLAN) and personal area networks (PAN) is shown. The adaptive antenna array system 10 maximizes the directivity of an antenna in a desired direction and simultaneously reduces the radiation in non-desired directions, such that the quality of a communications link is significantly improved. The adaptive antenna array system 10 includes a wireless network 100 with two wireless access units 101, 102 acting as wireless access points. Although shown in FIG. 1 at Locations A and B, respectively, the wireless access units 101, 102 may be located anywhere within the wireless network 100. The wireless access units 101, 102 are in communication with each other via a communications channel 106 that may be a wired or wireless connection. The wired connection may be any physical connection generally known in the art capable of transmitting data over an unspecified distance, including but not limited to coaxial cable or fiber optics. The wireless communication may be any wireless communications protocol generally known in the art including but not limited to any IEEE 802.11 standard or Bluetooth. Those skilled in the art will recognize that the adaptive antenna array system 10 need not be limited to two wireless access units, but may have multiple wireless access units located throughout the wireless network 100.

Each wireless access unit 101, 102 includes an antenna array 110, 111 having a plurality of individual antenna elements. The antenna arrays 110, 111 can be configured in any number of ways with different types of antennas or antenna elements generally known in the art, such as monopole, dipole, patch, or horn configurations. The antenna elements may be arranged in a variety of fixed m×n arrays, provided that the respective adaptive antenna array produces a desired radiation pattern. Throughout the present disclosure there are references to the wireless access unit 101, 102 transmitting a radiation pattern. It will be understood by those skilled in the art that the antenna array within each wireless access unit facilitates this transmission.

Each antenna element in the arrays 110, 111 has a weighting factor 104, 105 associated therewith. In the present disclosure, embodiments are described with the weighting factors arranged in a matrix configuration; however, in view of the present disclosure, those skilled in the art will appreciate that other, non-matrix configurations are possible as well. The weighting factors are based upon the amplitude and phase of each individual antenna element in an antenna array. Accordingly, the group of weighting factors or weighting factor matrix for any particular adaptive antenna array 110, 111 has the same configuration as the individual antenna elements in the respective antenna arrays 110, 111. For example, if the antenna elements are arranged in a 2×3 configuration, the weighting factor matrix for the array will be in the form of a 2×3 matrix. In the embodiment of FIG. 1, wireless access unit 101 has a 2×2 array of monopole antenna elements 110 and wireless access unit 102 has a 2×3 array of patch antenna elements 111. Accordingly, weighting factor 104 is a 2×2 matrix and weighting factor 105 is a 2×3 matrix.

Those skilled in the art, in light of the present disclosure, will appreciate that the weighting factor of an antenna element determines the radiation pattern produced by that antenna element, and thus that particular antenna array. The radiation pattern is a plot of the radiation received at a given distance from the source. By adjusting the amplitude and phase components of each individual antenna element, it is possible to customize the weighting factor, the weighting factor matrix, and thus the radiation pattern of the antenna array and the wireless access unit. The amplitude and phase components of the antenna elements are based upon an electrical excitation signal. The strength of the electrical excitation signal is controlled by a processor 112, 113 associated with each of the wireless access unit 101, 102. The weighting factor associated with each antenna element may be optimized to reduce spurious radiation (e.g., radiation transmitted in unwanted directions), thereby increasing the directivity of the antenna. This is accomplished by the processor 112, 113 exciting the different antenna elements with different voltages. The antenna elements may be excited using a variety of feeding techniques generally known in the art (e.g., microstrip line feed, probe feed, aperture-coupled feed, and proximity-coupled feed, etc.), providing a path for an electrical signal to excite the antenna elements. Additionally, the size and shape of each antenna element determines the operating frequency of the wireless access unit, although the wireless access unit is not limited to one particular frequency band. In the adaptive antenna array system 10, the wireless access units 101, 102 may operate in any frequency band where a communications device is capable of communicating with the wireless access unit. In one embodiment, the wireless access units 101, 102 operate in the ultra high frequency range (UHF). The UHF range has a frequency range between 300 MHz and 3 GHz. In another embodiment, the wireless access units 101, 102 operate in the super high frequency (SHF) range. The SHF range has a frequency range between 3 GHz and 30 GHz.

The adaptive antenna array system 10 includes a communications device 103 that may be any device capable of transmitting and receiving data using an electromagnetic signal. Communications device 103 is located in the wireless network 100 to transmit and receive data to/from another communications device (not shown) that is located on a different network. For example, the communications device 103 maybe a laptop, PDA, mobile phone, video game system, portable video game system, or portable music player. The communications device 103 is controlled by a user 109, desiring a connection to the wireless network 100 for the transfer of data via the communications device 103. The communications device 103 communicates with the wireless access units 101, 102 located in the wireless network 100 via communications channels 107, 108, respectively. The communications device 103 receives signal coverage from the wireless access unit 101, 102 that transmits the strongest signal to the communications device 103 in an effort to minimize the amount of data transfer error from communications device 103. Although shown in FIG. 1 at Location C, the communications device 103 may be located anywhere within the wireless network 100, and may move throughout the wireless network 100, causing the wireless access unit processors 112, 113 to adjust their respective weighting factors 104, 105, enabling the respective wireless access unit 101, 102 to provide communications device 103 with optimal signal coverage. Optimal signal coverage provides all of the communication devices on the wireless network with a threshold signal strength. The threshold signal strength is the strength of a signal needed in the direction of the communications device to minimize the number of error bits transmitted to and from the communications device. The communications device 103 and the wireless access units 101, 102 operate in the same frequency band, although in alternative embodiments the communications device 103 is capable of operating within multiple frequency bands and is not limited to communicating with only one wireless access unit. It should be noted that the embodiments are not limited to two wireless access units and one communications device, but may be used with configurations having multiple wireless access units and multiple communication devices.

Figure 3:
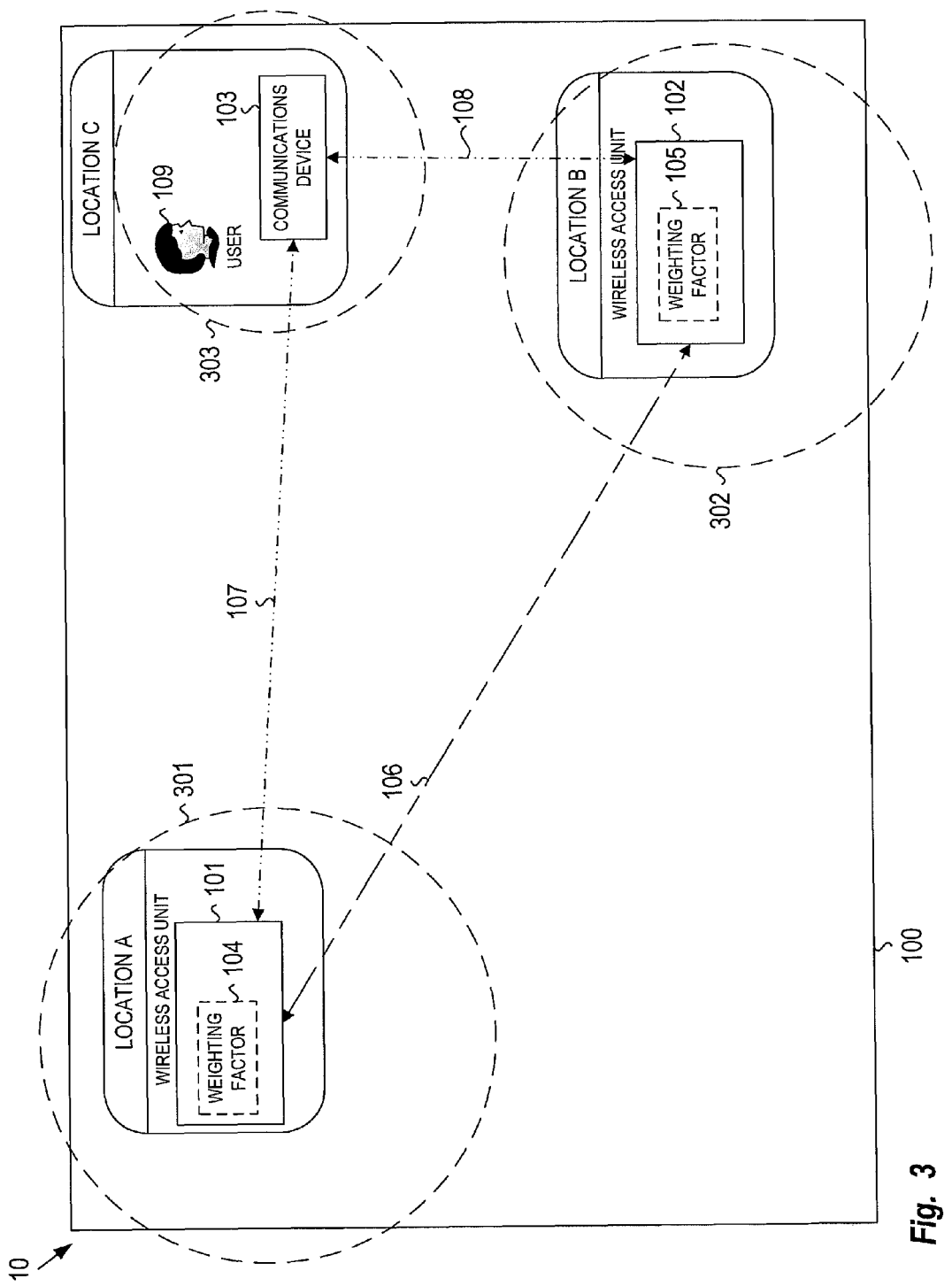
FIG. 3 is a system diagram of the adaptive antenna array system of FIG. 1 showing initial radiation patterns.

Referring to FIG. 3, the initial radiation patterns 301, 302 of the wireless access units 101, 102 and the radiation pattern 303 of the communications device 103 are shown. The radiation patterns 301, 302, 303 indicate the signal strength of a wireless access unit in a particular direction. In FIG. 3, the radiation patterns shown are generally omnidirectional, meaning that the wireless access unit and/or communications device radiates and receives radiation generally equally in/from all directions. The zero axis reference point for a particular wireless access unit is generally near the center of that wireless access unit. As shown in FIG. 3, the size of the radiation patterns are depicted to represent the general signal strength relative to the other radiation patterns present in the wireless network 100. Initially, the strength of the signals transmitted by wireless access units 101, 102 is approximately equal, but are larger than the radiation pattern 303 of communications device 103. The initial radiation patterns are determined by the type of antenna elements used and the strength of the excitation signal for each antenna element. For example, if dipole antenna elements are used, the initial radiation pattern of the wireless access unit would resemble a Hertzian dipole. Although FIG. 3 depicts the radiation patterns 301, 302, 303 having an omnidirectional radiation pattern, in light of the present disclosure, those skilled in the art will recognize that the wireless access units 101, 102 and the communications device 103 are not limited to an initial radiation pattern that is omnidirectional.

Figure 4:
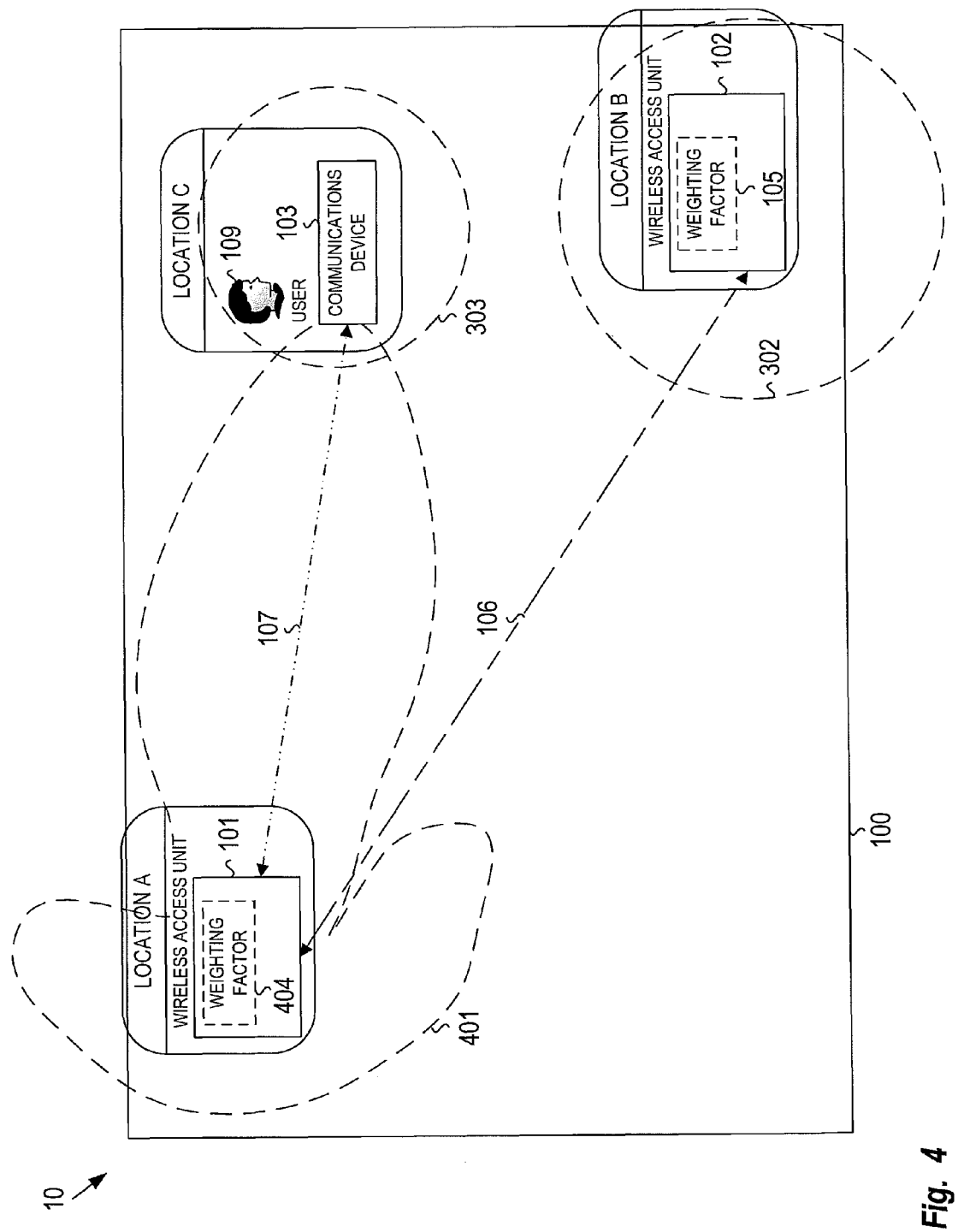
FIG. 4 is a system diagram of the adaptive antenna array system of FIG. 1 showing adjusted radiation patterns.

Referring to FIG. 4, when the communications device 103 establishes communication with wireless access unit 101 via the communications channel 107, wireless access unit 101 automatically modifies its weighting factor from weighting factor 104 to 404 to produce an alternate radiation pattern 401. The communications device 103 provides feedback to the wireless access unit 101 in order to optimize the weighting factor 404. The optimization process involves several iterations of the wireless access unit processor 112 adjusting its weighting factor based on the feedback from the communications device 103 until a threshold signal strength is received by the communications device. As discussed, the threshold signal strength is the strength of a signal needed by the communications device to minimize the number of error bits transmitted and received by the communication device. As shown in FIG. 4, the weighting factor 404 causes wireless access unit 101 to have a highly directional radiation pattern 401. Those skilled in the art will appreciate that the directivity of an antenna is a measure of the concentration of the radiated power in a particular direction. It may be regarded as the ability of the antenna to direct radiated power in a given direction. An antenna with a highly directional radiation pattern is capable of specifically transmitting data in one direction and minimizing the radiation that is transmitted in other directions. Thus, the strength of the signal transmitted from antenna array 110 in wireless access unit 101 should be strong enough for other communication devices on wireless network 100 to receive a cognizable signal from wireless access unit 101. Once wireless access unit 101 has optimized its radiation pattern 401 with respect to communications device 103, wireless access unit 101 transmits its weighting factor 404 to wireless access unit 102 via the communications channel 106. This allows the wireless access unit processor 113 to know the radiation pattern being transmitted by wireless access unit 101, and therefore the direction in which wireless access unit 101 is targeting its transmitted signal. Those skilled in the art will recognize that, although the radiation pattern 401 shown in FIG. 4 is a typical radiation pattern, any radiation pattern that provides optimal coverage to the communications devices on the network may be employed by the corresponding wireless access unit(s).

Figure 5:
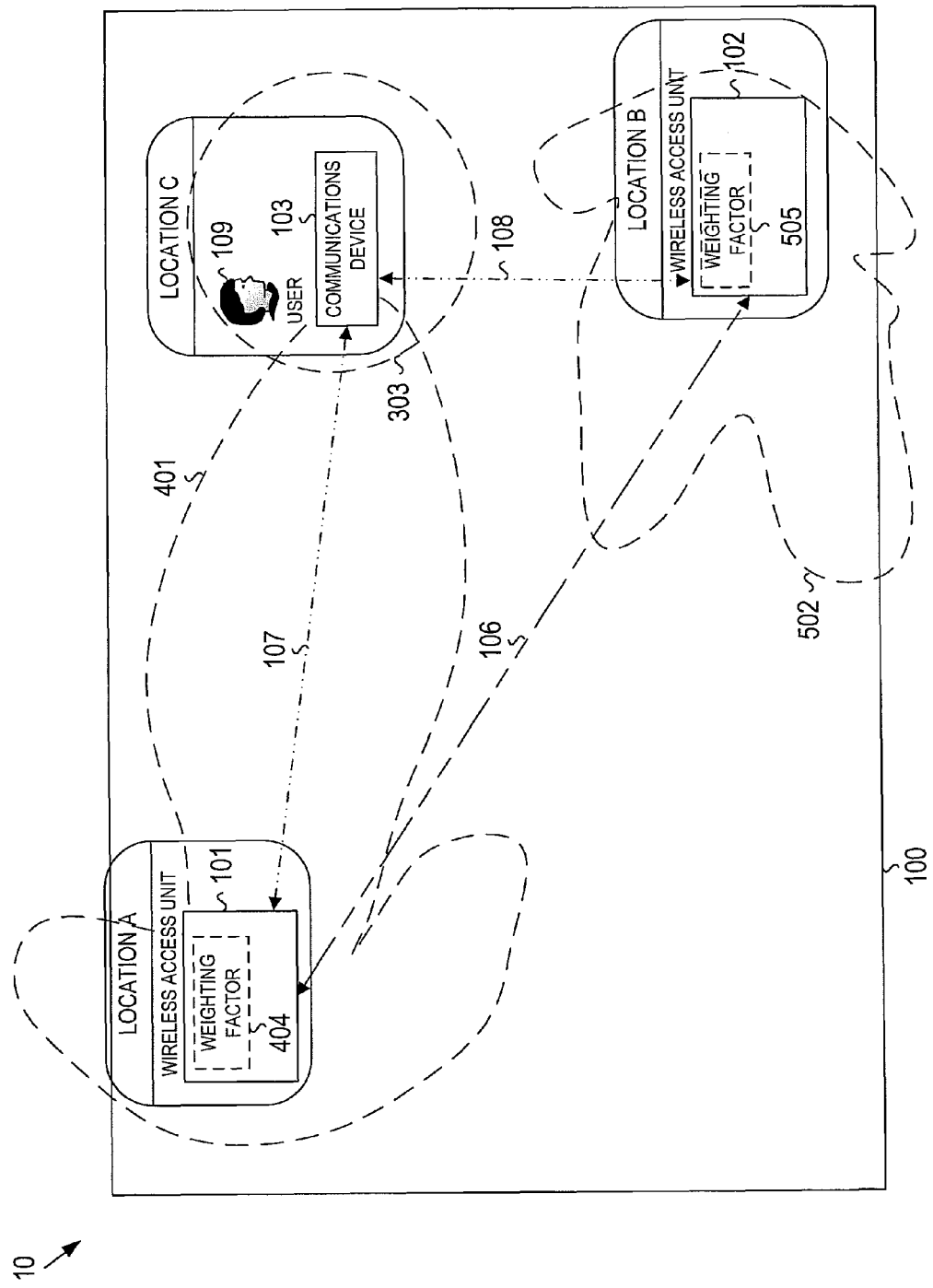
FIG. 5 is a system diagram of the adaptive antenna array system of FIG. 1 showing adjusted radiation patterns.

In FIG. 5 wireless access unit 102 has received weighting factor 404 from wireless access unit 101 and has adjusted its weighting factor from 105 to 505. Since the wireless access units 101, 102 are in communication with each other via communications channel 106, the wireless access unit processor 112 provides feedback to wireless access unit 102, which allows the wireless access unit processor 113 to adjust its weighting factor and its radiation pattern. Feedback from the wireless access unit processor 112 includes recommendations on how to adjust weighting factor 505. Wireless access unit 102 is also in communication with communications device 103 via the communications channel 108. Communications device 103 also provides feedback to wireless access unit 102. Wireless access unit 102 adjusts its weighting factor to produce an alternate radiation pattern 502 that provides communications device 103 with sufficient signal coverage while at the same time minimizing signal overlap with radiation pattern 401. Through several iterations, wireless access unit 102 modifies weighting factor 505 to adjust radiation pattern 502 and minimize the amount of radiation in the direction of communications device 103, while still radiating a cognizable signal in the direction of communications device 103. This will allow wireless access unit 102 to provide communications device 103 with signal coverage if wireless access unit 101 cannot provide communications device 103 with signal coverage.

Figure 6:
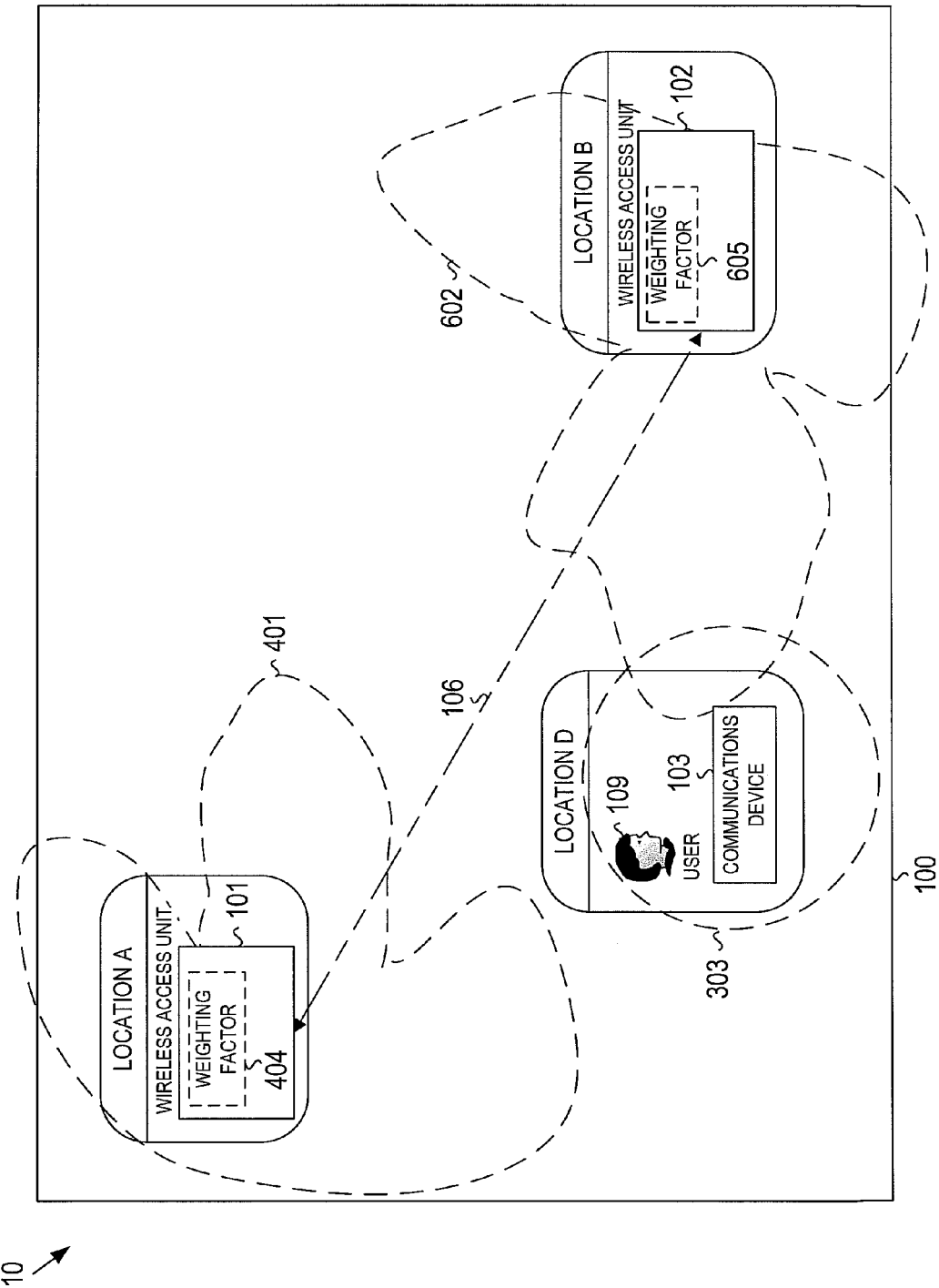
FIG. 6 is a system diagram of the adaptive antenna array system of FIG. 1 showing adjusted radiation patterns in view of movement of the communications device.

In FIG. 6, the communications device 103 has moved around wireless network 100 to location D and receives insufficient signal strength from wireless access unit 101. If wireless access unit 102 can provide communications device 103 with a stronger signal, then wireless access unit 102 modifies its weighting factor to provide communications device 103 with signal coverage. Wireless access unit 101 will no longer provide communications device 103 with optimal signal coverage after wireless access unit 102 modifies its weighting factor. To accomplish this, wireless access unit 101 transmits weighting factor 404 via communications channel 106 to wireless access unit 102. Wireless access unit processor 113 modifies weighting factor 605 to product an adjusted radiation pattern 602 until optimal coverage is provided to communications device 103 where wireless access unit 102 provides the strongest available signal. Wireless access unit 102 also modifies weighting factor 605 to minimize any overlapping signal coverage with wireless access unit 101. As discussed, the optimization process ensures that communications device 103 receives a threshold signal strength from wireless access unit 102. Once radiation pattern 602 is optimized to provide communications device 103 with signal coverage, wireless access unit 102 transmits its weighting factor 605 to wireless access unit 101 via communications channel 106.

Figure 7:
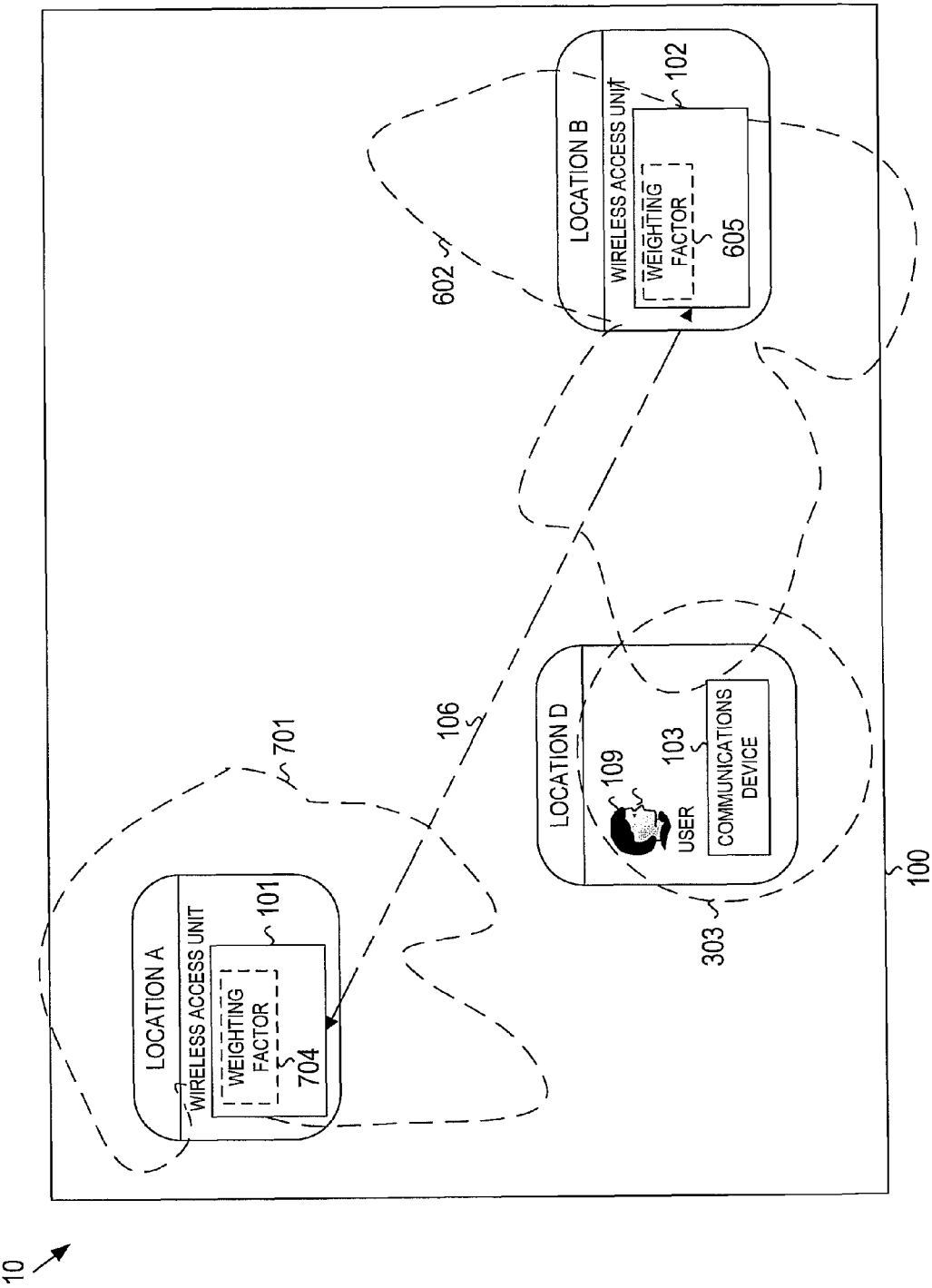
FIG. 7 is a system diagram of the adaptive antenna array system of FIG. 1 showing adjusted radiation patterns in view of movement of the communications device.

Referring to FIG. 7, when wireless access unit 102 provides signal coverage to communications device 103 via radiation pattern 602, wireless access unit 101 adjusts its weighting factor to minimize the amount of radiation in the direction of communications device 103 and to minimize signal overlap with radiation pattern 602. Since the wireless access units 101, 102 are in communication with each other via communications channel 106, the wireless access unit processor 113 provides feedback to wireless access unit 101, which allows the wireless access unit processor 112 to adjust its weighting factor and its radiation pattern. Feedback from the wireless access unit processor 113 includes recommendations on how to adjust weighting factor 704. Through several iterations, wireless access unit 101 adjusts its weighting factor from 404 to 704 to minimize the amount of radiation in the direction of communications device 103, but still radiates a cognizable signal in the direction of communications device 103. This allows wireless access unit 101 to provide communications device 103 with signal coverage if wireless access unit 102 cannot provide communications device 103 with sufficient signal coverage. As shown in FIG. 7, the weighting factor 704 of wireless access unit 101 results in a radiation pattern 701. Once radiation pattern 701 is optimized, wireless access unit 101 transmits its weighting factor 704 to wireless access unit 102 via communications channel 106.

A number of calculations may be implemented by the wireless access unit processors 112, 113 to calculate the optimal weighting factors and thus the the weighting factor matrix for the antenna arrays 110, 111, to produce the optimal radiation pattern of each wireless access unit 101, 102. These calculations are based on measurements of the signal strength received by a communications device 103, the particular location of the communications device 103, and the weighting factors received from all of the wireless access units located on the wireless network 100. The calculations are computed when a change in the wireless network configuration occurs (e.g., new communications device, wireless access unit failure, communication device movement, etc.). Each wireless access unit processor 112, 113 is electrically coupled to the respective antenna elements. The wireless access unit processors 112, 113 may compute their weighting factors using techniques generally known in the art (e.g., Multiple Signal Classification, Estimation of Signal Parameters via Rotational Invariant Techniques).

Figure 13:
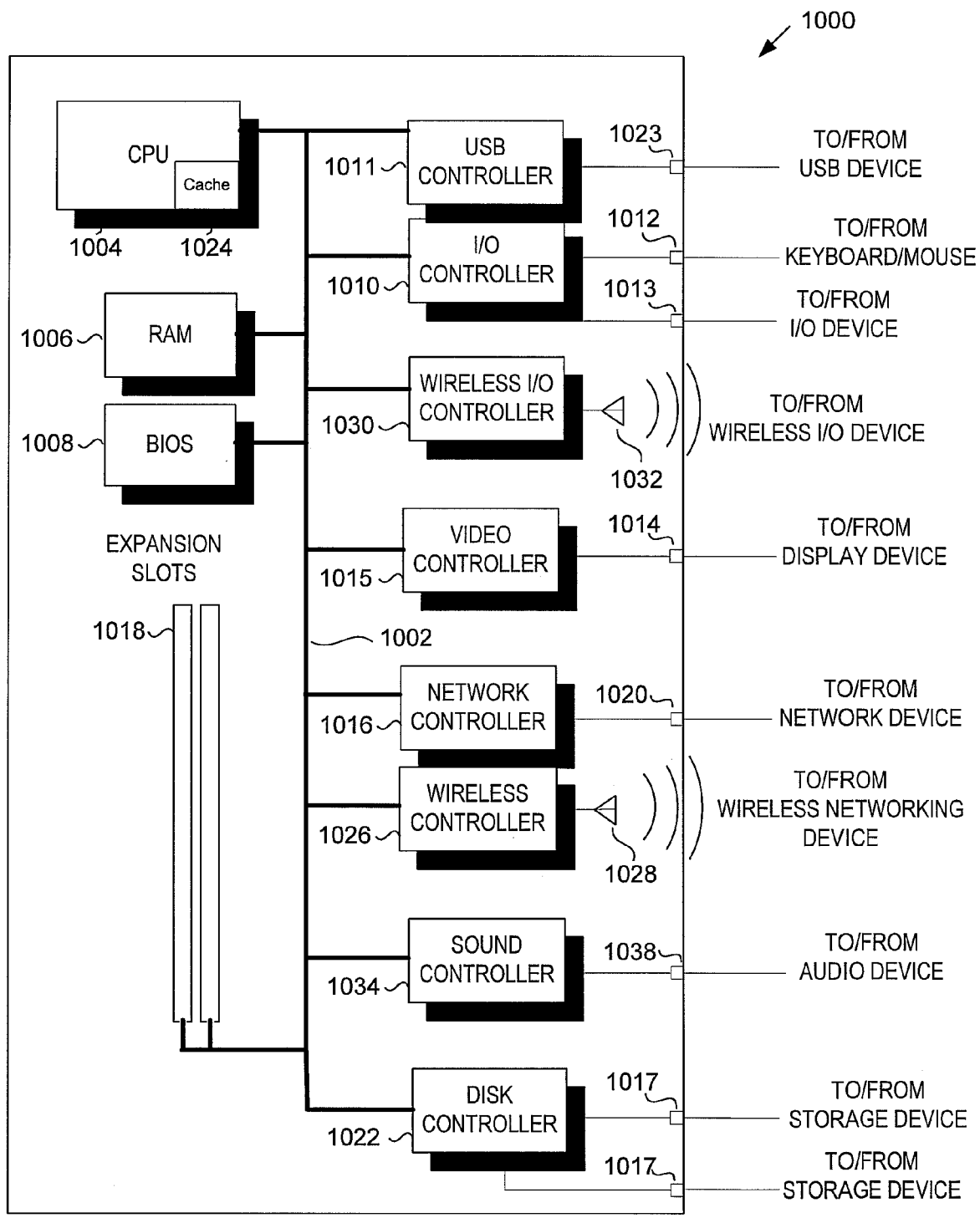
FIG. 13 is a block diagram of a computer system through which the embodiments of the present disclosure may be implemented.

FIG. 13 is a block diagram of a computer architecture or system 1000 through which the embodiments of the adaptive antenna array system 10, including the radiation processors 112, 113, may be implemented. A system bus 1002 transports data amongst the Central Processing Unit (CPU) 1004, RAM 1006, the Basic Input Output System (BIOS) 1008 and other components. The CPU 1004 may include a cache memory component 1024. The computer system 1000 may include one or more external storage ports 1017 for accessing a hard disk drive, floppy disk drive, optical storage drive (e.g., CD-ROM, DVD-ROM, DVD-RW), flash memory, tape device, or other storage device (not shown). The relevant storage device(s) are connected through the external storage port 1017 which is connected to the system bus 1002 via a disk controller 1022. A keyboard and pointing device (e.g. mouse, touch pad) (not shown) can be connected to the keyboard/mouse port(s) 1012, and other I/O devices could be connected to additional I/O port(s) 1013, which are connected to the system bus 1002 through the I/O controller 1010. Additional ports or devices, such as serial ports, parallel ports, firewire adapters, or biometric devices (not shown), may be utilized through the I/O controller 1010. A display device (not shown) can be connected to a display device port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be connected to the USB port 1023 which is connected to the system bus 1002 through the USB controller 1011. Other devices, such as cellular phones, PDAs, and other portable devices may also be connected wirelessly via a wireless I/O antenna 1032 that is connected to a wireless I/O controller 1030. Examples of wireless I/O technologies include, but are not limited to, Bluetooth, Infrared (IR), and Radio-Frequency (RF). Audio devices, such as microphones, speakers, or headphones may be connected to a sound port 1038 that is connected to a sound controller 1034 that is connected to the system bus 1002. Expansion slots 1018 can be Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and an internal or external battery. Detailed descriptions of these devices have been omitted for convenience only and should not be construed as limiting.

Figure 2:
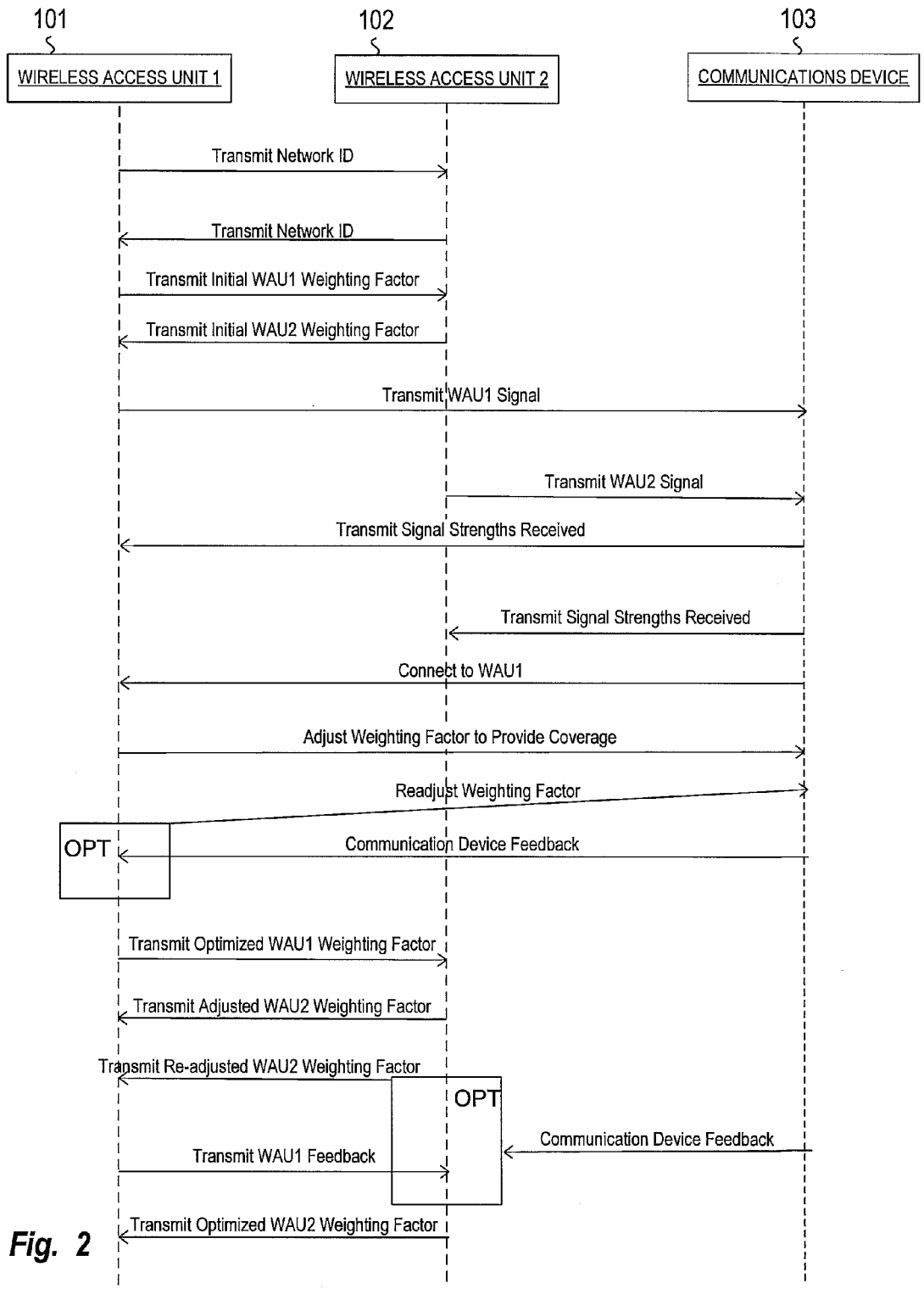
FIG. 2 is a sequence diagram of the adaptive antenna array system of FIG. 1.

Referring to FIG. 2, a sequence of adjusting antenna weighting factors in response to a communications device is shown. The wireless access units 101, 102 establish communications with each other via communication channel 106. As discussed, the communications channel 106 may be a wired or wireless connection. Wireless access unit 101 transmits its network identification information to wireless access unit 102. In response, wireless access unit 102 sends its network identification information to wireless access unit 101. This exchange of network identification information, which includes location information, enables the wireless access units 101, 102 to cooperatively adjust their weighting factors. Once communications channel 106 is established, the wireless access units 101, 102 exchange initial weighting factors 104, 105. When communications device 103 enters wireless network 100, wireless access units 101, 102 transmit a signal to communications device 103. Communications device 103 compares the strength of the signals received and transmits this information to wireless access units 101, 102. The wireless access unit that provides communications device 103 with the strongest signal adjusts its weighting factor to provide communications device 103 with optimal signal coverage. In the embodiment of FIG. 2, wireless access unit 101 provides communications device 103 with the strongest signal. Accordingly, communications device 103 provides feedback to wireless access unit 101 by transmitting the strength of the signal received to wireless access unit 101. Until a threshold signal strength is received by communications device 103, as previously discussed, the wireless access unit processor 112 continues to adjust and optimize its weighting factor 404. When wireless access unit 101 optimizes its weighting factor to provide communications device 103 with signal coverage, it transmits weighting factor 404 to wireless access unit 102. In response, the wireless access unit processor 113 adjusts its weighting factor from 105 to 505. Wireless access unit 102 adjusts its weighting factor and continues to transmit the adjusted weighting factor to wireless access unit 101 until sufficient signal coverage is provided to communications device 103 and signal overlap with wireless access unit 102 is minimized. Sufficient signal coverage is achieved when communications device 103 receives a minimal cognizable signal from wireless access unit 102. When wireless access unit 102 has adjusted its weighting factor 505 to provide communications device 103 with sufficient signal coverage, it transmits its weighting factor 505 to wireless access unit 101. Although only two wireless access units are noted in FIG. 2, more than two wireless access units may be utilized to cooperatively adjust antenna weighting factors in response to a communications device 103.

Figure 8:
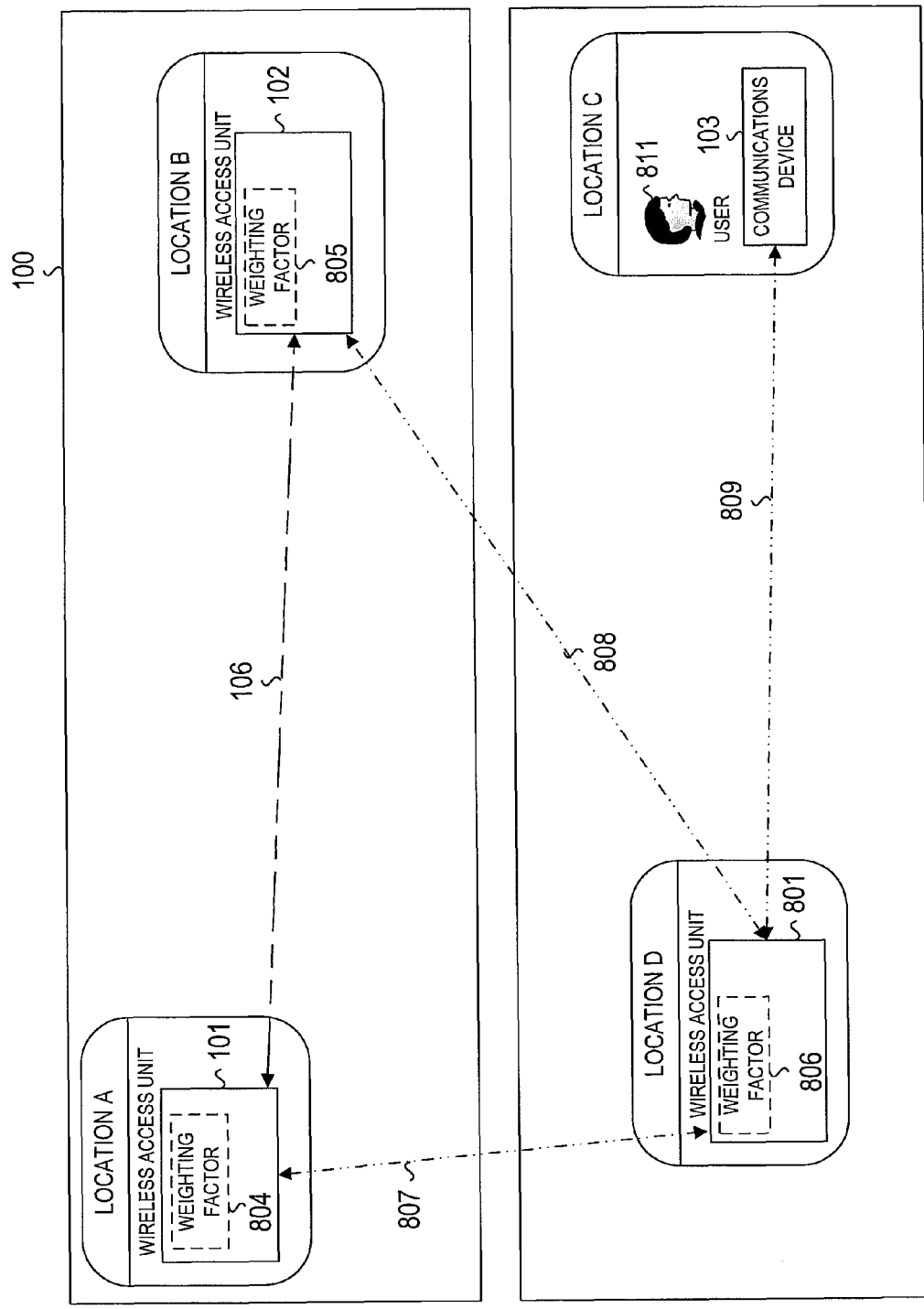
FIG. 8 is a system diagram of an adaptive antenna array system according to second embodiment.

Referring to FIG. 8, two wireless networks capable of communicating with each other are shown. The wireless networks 100, 800 communicate with each other in order to provide optimal signal coverage among and between communication devices 103 and to reduce the amount of spurious radiation between the wireless networks. For example, this may be applicable to an office building with multiple business entities in a confined space or a residential area with neighboring wireless networks. At least one wireless access unit from a first network is in communication with at least one wireless access unit from a second network. In the embodiment of FIG. 8, wireless access unit 101 communicates with wireless access unit 801 via communications channel 807. Similarly, wireless access unit 102 communicates with wireless access unit 801 via communications channel 808. The communication channels 807, 808 allow the wireless access units 101, 102, 801 to transmit their weighting factors 804, 805, 806 to the other wireless access units. Wireless access units 101, 102, transmit their weighting factors 804, 805, respectively to wireless access unit 801. Communications device 103 communicates with wireless access unit 801 via communications channel 809, but may establish a communications channel with any wireless access unit that transmits a cognizable signal.

Figure 9:
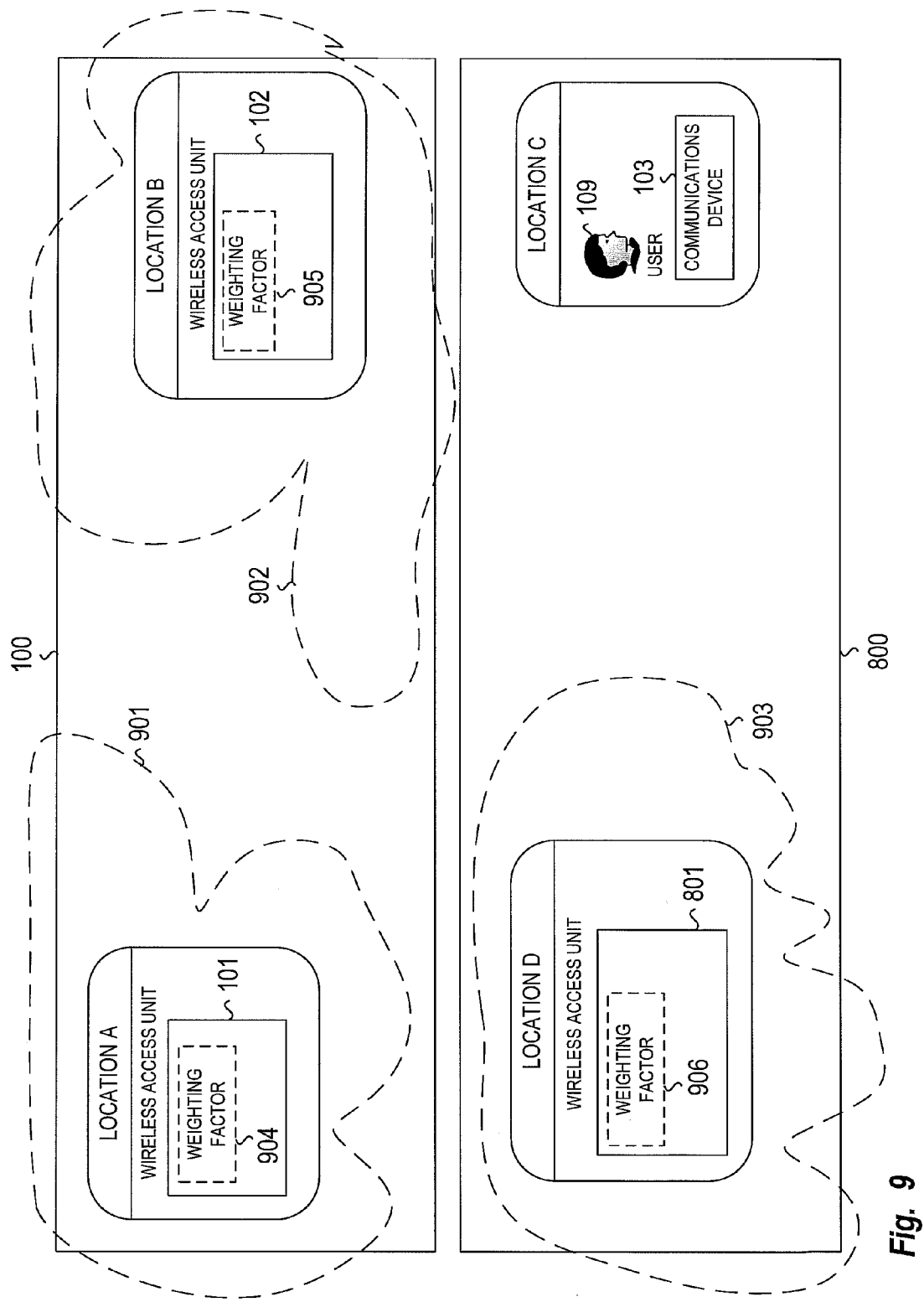
FIG. 9 is a system diagram of the adaptive antenna array system of FIG. 8 showing radiation patterns.

Referring to FIG. 9, typical radiation patterns of the wireless access units 101, 102, 801 of the embodiment of FIG. 8 are shown. The objective of each radiation pattern is to provide optimal signal coverage to the communications device located on a first wireless network while minimizing spurious radiation that is transmitted onto at least one other wireless network. In FIG. 8, weighting factors 804, 805 determine the radiation patterns 901, 902 for wireless access units 101, 102, respectively. Furthermore, weighting factor 906 determines radiation pattern 903 for wireless access unit 801. Communications device 103 receives a signal from wireless access units 102, 801. Wireless access unit 102 reports to wireless access unit 101 about the presence of communications device 103 because wireless access unit 101 does not transmit a cognizable signal to communications device 103. Although the communications device 103 may connect to either wireless network 100 or wireless network 800, within the selected wireless network, communications device 103 receives signal coverage from the wireless access unit that transmits the strongest signal to communications device 810. The process of optimizing radiation patterns between wireless networks 100, 800 involves wireless access unit 801 providing signal coverage to communications device 103 and transmitting its weighting factor to wireless access unit 101 via communications channel 807. Wireless access unit 801 may also transmit its weighting factor to wireless access unit 102 via communications channel 808. Wireless access unit 801 adjusts its weighting factor 906 until a radiation pattern 903 that maintains signal coverage to communications device 103 and minimizes spurious radiation onto wireless network 100 is produced. Wireless access units 101, 102 provide feedback to wireless access unit 801 until a maximum accepted signal strength is achieved. The maximum accepted signal strength is the strength of a signal from a first wireless network that a second wireless network finds acceptable. Once wireless access unit 801 adjusts its weighting factor 906 to produce an acceptable radiation pattern 903, wireless access unit 801 provides feedback to both wireless access units 101, 102 until a maximum accepted signal strength is received from wireless access units 101, 102.

Figure 10:
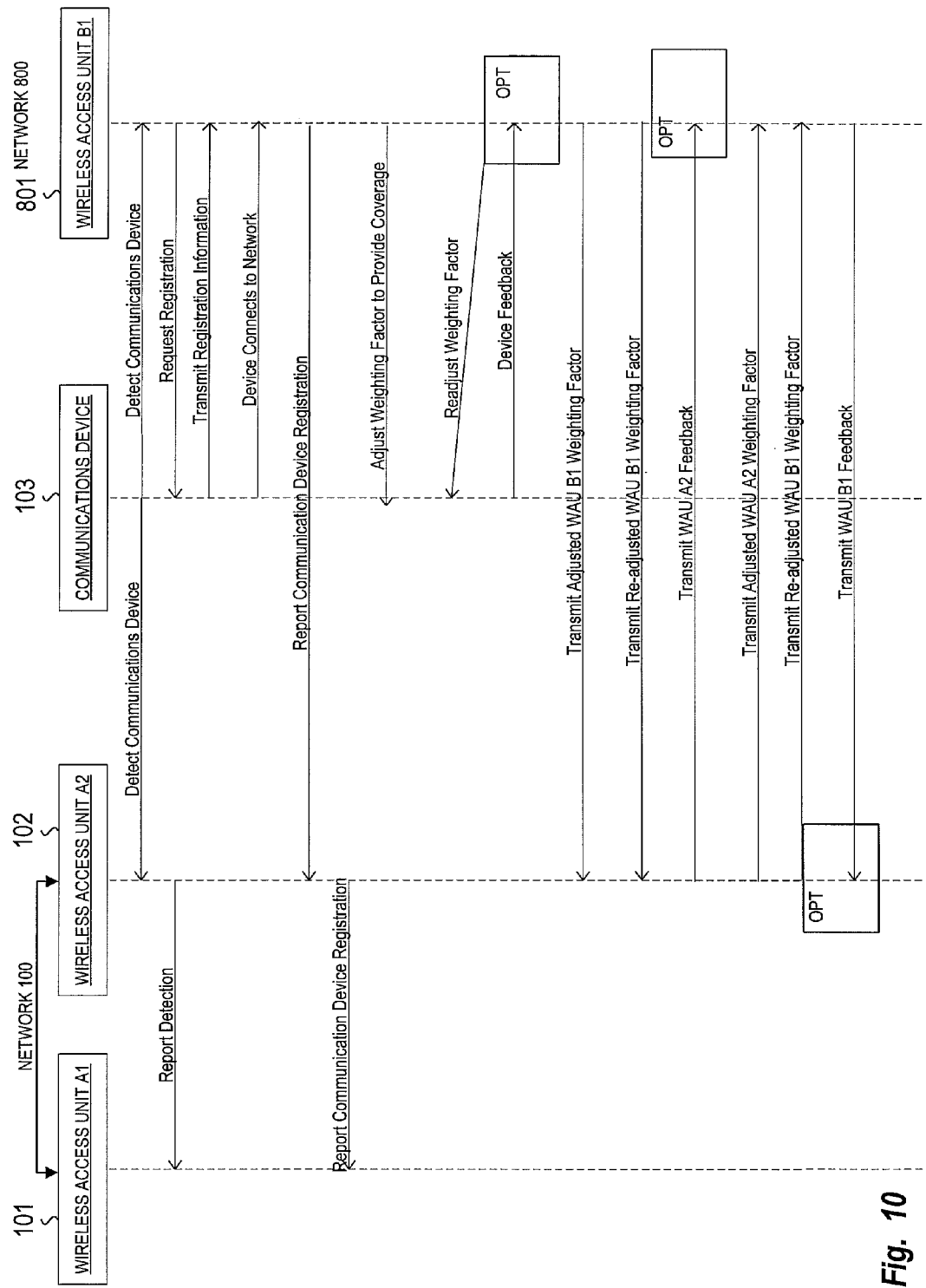
FIG. 10 is a sequence diagram of the adaptive antenna array system of FIG. 8.

Referring to FIG. 10, the sequence of reducing spurious radiation between wireless networks is shown. Communications device 103 detects wireless access units 102, 801 that are located on two different wireless networks 100, 800, respectively. If a wireless network has more than one wireless access unit and the communications device does not receive a cognizable signal from all of the wireless access units, then information about the communications device is transmitted to those wireless access unit from the wireless access units that transmit a cognizable signal to the communications device. In the embodiment of FIG. 10, wireless access unit 801 requests that the communications device 103 register with wireless network 800. The communications device 103 agrees to register with wireless network 800. Wireless access unit 801 in wireless network 800 accepts the registration of communications device 103 and transmits this registration information to wireless access unit 102 located in wireless network 100. Wireless access unit 102 receives this registration information and transmits it to wireless access unit 101. Wireless access unit 801 adjusts its current weighting factors to provide communications device 103 with optimal signal coverage. Communications device 103 provides feedback to wireless access unit 801 until a threshold signal strength is received, as previously discussed. Once communications device 103 receives optimal signal coverage from wireless access unit 801, wireless access unit 801 transmits its weighting factor 906 to wireless access unit 102. This allows the wireless access unit processor 113 to provide feedback to wireless access unit 801, which adjusts its weighting factor 906 until a maximum accepted signal strength is received by wireless access unit 102. Once wireless access unit 801 has adjusted its weighting factor to minimize spurious radiation, wireless access unit 801 provides feedback in a manner as described above to reduce spurious radiation from wireless access unit 102. The sequence of reducing spurious radiation between wireless networks may be adapted to include multiple wireless networks, multiple wireless access units, and multiple communication devices.

Figure 11:
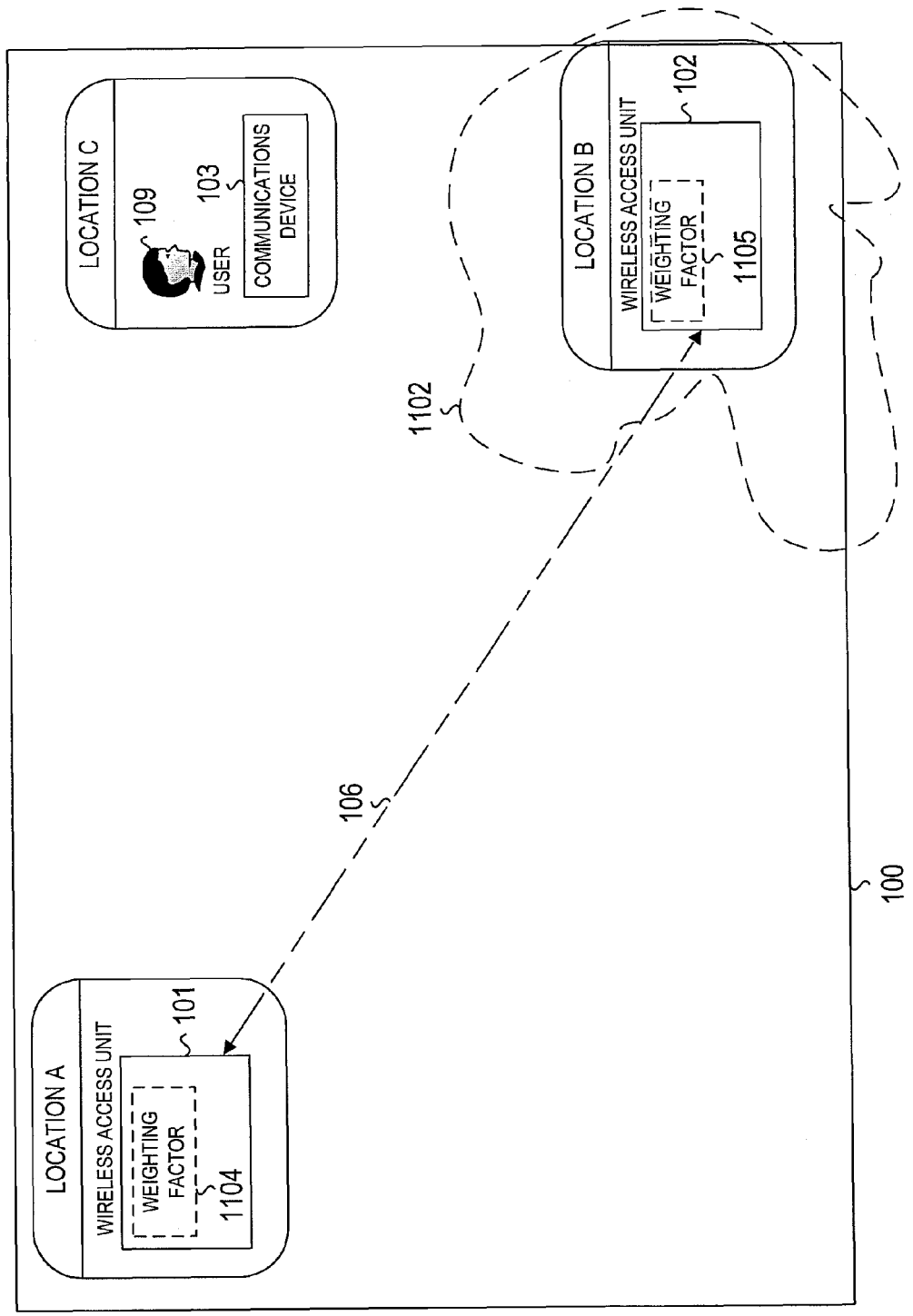
FIG. 11 is a system diagram of a cooperative antenna scheme system in a wireless network according to one embodiment.

In another embodiment, the wireless access units provide an automatic failover mechanism in the event of a wireless access unit failure. Referring again to FIG. 5, typical radiation patterns of wireless access units 101, 102 are shown. Wireless access unit 101 provides signal coverage to communications device 103. Wireless access units 101, 102 are in communication with each other via communications channel 106. FIG. 11 shows the automatic failover mechanism between wireless access units 101, 102, such that wireless access unit 102 automatically adjusts its radiation pattern 1102 upon detecting a communication failure with wireless access unit 101. As previously discussed, wireless access unit 102 may produce different radiation patterns, such that the pattern is adjusted to provide communications device 103 with a threshold signal strength. The wireless access unit that provides signal coverage to the communications device 103 in the event of a wireless access unit failure is the wireless access unit that transmits the next strongest signal to the communication device 103. When communications device 103 is initialized as described above, received signal strength information is transmitted from the communications device to each of the wireless access units. The failover hierarchy is based upon the received signal strength for a communications device. Since wireless access unit 102 transmits a cognizable signal in the direction of communications device, wireless access unit 102 detects and adjust its weighting factor 1105 upon failure of the wireless access unit 101. The wireless access unit processor 113 optimizes the weighting factor 1105 in a manner as described above until communications device 103 receives a threshold signal strength.

Figure 12:
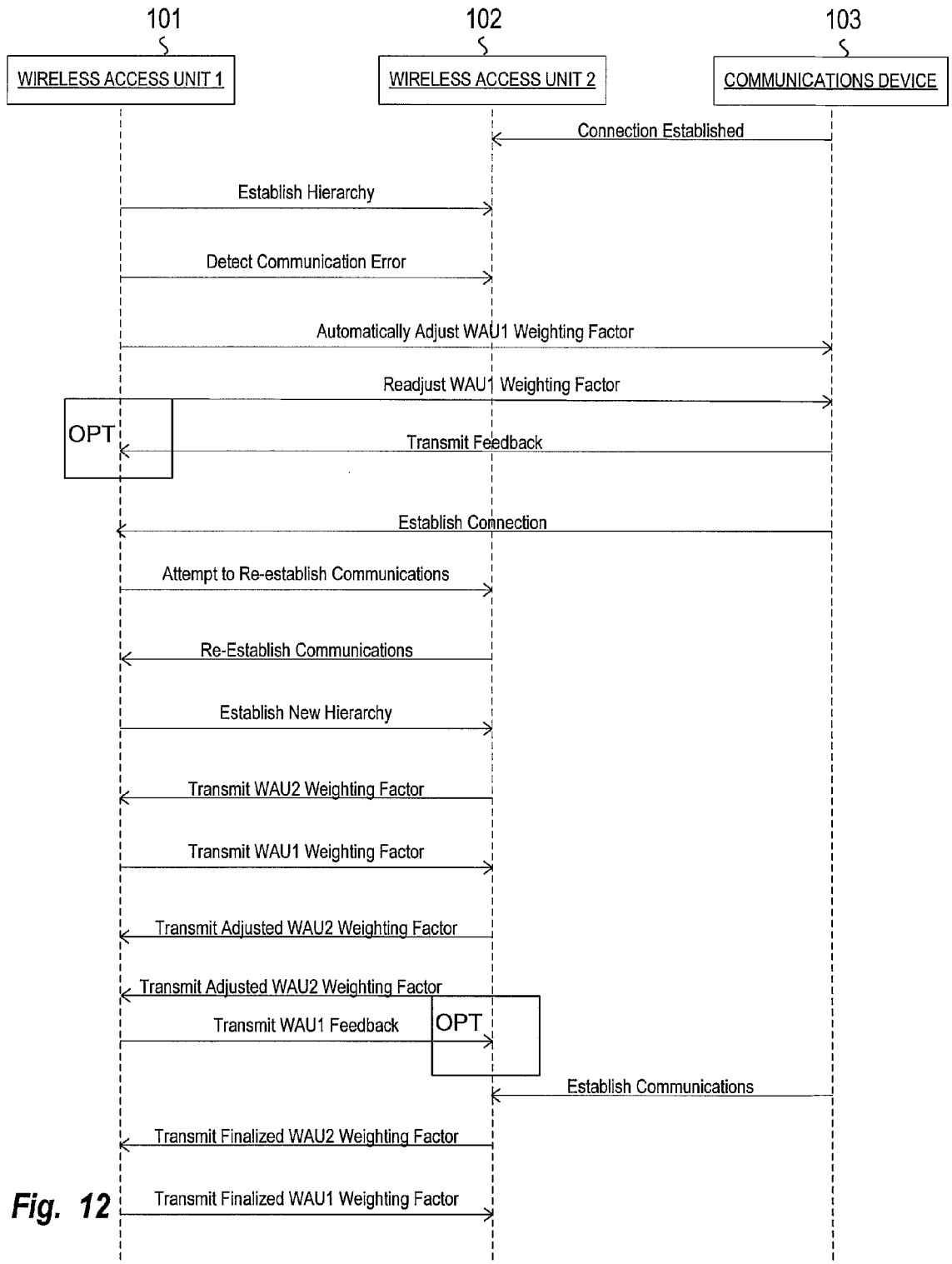
FIG. 12 is a sequence diagram of the adaptive antenna array system of FIG. 11.

Referring to FIG. 12, the failover mechanism sequence is shown. When a wireless access unit provides signal coverage to a communications device, a hierarchy is created. The hierarchy is based upon the signal strength received at the communications device from the wireless access units. The received signal strength data is transmitted back to each of the wireless access units. In this embodiment, communications device 103 receives a signal from wireless access units 101, 102. Since wireless access unit 101 provides communications device 103 with the strongest signal, in the event of wireless access unit 101 device failure, wireless access unit 102 automatically adjusts its weighting factor 1105 to provide communications device 103 with optimal signal coverage. The hierarchy between the wireless access units is stored locally and updated in the event of a new communications device or if a communications device changes position within the wireless network. Based on the failover hierarchy, when wireless access unit 102 detects that a communications failure with wireless access unit 101, the wireless access unit processor 113 automatically modifies its weighting factor to provide communications device 103 with signal coverage. As described before, communications device 103 provides feedback to wireless access unit 102 as the wireless access unit processor 113 adjusts weighting factor 1105. Wireless access unit 101 will be pinged by wireless access unit 102 to determine when re-establishing communications is possible. When communications are re-established between the wireless access units 101, 102, wireless access unit 101 initializes its weighting factor 1104. Wireless access unit 102 transmits its weighting factor 1105 to wireless access unit 101. A new hierarchy is established between wireless access units 101, 102 to determine which wireless access unit should provide access to the available communication devices. The new hierarchy is based on the location and signal strength received by the current communication devices in the wireless network. The failover mechanism is not limited to two wireless access units and one communications device, but may apply to wireless networks comprising at least two wireless access units and at least one communications device.

The embodiments of the present disclosure may be implemented with any combination of hardware and software. If implemented as a computer-implemented apparatus, the embodiment is implemented using means for performing all of the steps and functions described above.

The embodiments of the present disclosure can be included in an article of manufacture (e.g., one or more computer program products) having, for instance, computer useable media. The media has embodied therein, for instance, computer readable program code means for providing and facilitating the mechanisms of the embodiments of the present disclosure. The article of manufacture can be included as part of a computer system or sold separately.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of providing signal coverage in a first wireless network, the method comprising:
   (a) establishing cooperative communications between a first wireless access unit and a second wireless access unit in the first wireless network to initialize a first wireless access unit antenna array weighting factor and a second wireless access unit antenna array weighting factor;
   (b) modifying the first wireless access unit antenna array weighting factor to provide an optimal signal coverage in response to an interaction with a communications device, wherein modifying the first wireless access unit antenna array weighting factor occurs if the first wireless access unit provides the communications device with a signal stronger than the second wireless access unit;
   (c) transmitting the modified first wireless access unit antenna array weighting factor to the second wireless access unit; and
   (d) modifying the second wireless access unit antenna array weighting factor based on the modified first wireless access unit antenna array weighting factor to provide the communications device with a cognizable signal and to reduce signal overlap with the first wireless access unit.

2. The method of claim 1, further comprising:
   (e) monitoring a location of the communications device;
   (f) modifying the second wireless access unit antenna array weighting factor, wherein modifying the second wireless access unit antenna array weighting factor occurs if the second wireless access unit provides the communications device with a stronger signal than the first wireless access unit;
   (g) transmitting the modified second wireless access unit antenna array weighting factor to the first wireless access unit; and
   (h) modifying the first wireless access unit antenna array weighting factor to provide the communications device with a cognizable signal and to reduce signal overlap with the second wireless access unit.

3. The method of claim 1, wherein the first wireless access unit antenna array weighting factor is modified until the communications device receives a threshold signal strength from the first wireless access unit.

4. The method of claim 1, further comprising:
   (e) establishing a failover hierarchy between the first wireless access unit and the second wireless access unit for a wireless access unit failure based upon the signal received by the communications device.

5. The method of claim 4, further comprising:
   (f) detecting a communication error from the first wireless access unit; and
   (g) modifying the second wireless access unit antenna array weighting factor to provide the communications device with optimal signal coverage, wherein modifying the second wireless access unit antenna array weighting factor is based on the failover hierarchy.

6. The method of claim 1, further comprising:
   (e) transmitting the first wireless access unit antenna array weighting factor to a second wireless network; and
   (f) receiving feedback from the second wireless network to adjust the first wireless access unit antenna array weighting factor, wherein feedback is provided from the second wireless network until an acceptable threshold signal strength is transmitted by the first wireless access unit to the second wireless network.

7. A system for providing signal coverage in a wireless network, comprising:
   (a) a first wireless access unit having a first wireless access unit processor controlling a first wireless access unit antenna array weighting factor associated therewith;
   (b) a second wireless access unit having a second wireless access unit processor controlling a second wireless access unit antenna array weighting factor; and
   (c) a first communications channel to facilitate transmission of the first wireless access unit antenna array weighting factor and the second wireless access unit antenna array weighting factor between the first and second wireless access units, wherein
      the first wireless access unit processor is configured to modify the first wireless access unit antenna array weighting factor to provide an optimal signal coverage in response to a communication device if the first wireless access unit provides the communication device with a signal stronger than the second wireless access unit;
      the second wireless access unit processor is configured to modify the second wireless access unit antenna array weighting factor in response to receiving the first wireless access unit antenna array weighting factor; and the second wireless access unit is configured to provide the communication device with a cognizable signal and reduce signal overlap with the first wireless access unit.

8. The system of claim 7, further comprising:
   (d) a second communications channel to facilitate transmission of the first wireless access unit antenna array weighting factor to a second wireless network, wherein the first wireless access unit processor is configured to modify the first radiation antenna array weighting factor until an acceptable threshold signal strength is transmitted to the second wireless network.

9. The system of claim 7, wherein the first wireless access unit processor and the second wireless access unit processor are configured to monitor a location of the communication device, wherein the second wireless access unit processor is configured to modify the second wireless access unit antenna array weighting factor if the second wireless access unit provides the communication device with a signal stronger than the first wireless access unit, wherein the first wireless access unit processor is configured to modify the first wireless access unit antenna array weighting factor in response to receiving the second wireless access unit antenna array weighting factor, and wherein the first wireless access unit is configured to provide the communication device with a cognizable signal and reducing signal overlap with the second wireless access unit.

10. The system of claim 7, wherein the first wireless access unit processor is configured to modify the first wireless access unit antenna array weighting factor until the communications device receives a threshold signal strength from the first wireless access unit.

11. The system of claim 7, wherein the first wireless access unit processor and the second wireless access unit processor are configured to establish a failover hierarchy based upon the signal strength received by the communications device.

12. The system of claim 7, wherein the second wireless access unit processor is configured to detect a communication error with the first wireless access unit, wherein the second wireless access unit processor is configured to modify the second wireless access unit antenna array weighting factor to provide the communications device with optimal signal coverage, wherein modifying the second wireless access unit antenna array weighting factor is based on the failover hierarchy.

13. A method of reducing spurious radiation, the method comprising:
   (a) establishing communications between a first wireless access unit within a first wireless network and a second wireless access unit within a second wireless network;
   (b) registering at least one communications device to provide the communications device with access to the first wireless access unit within the first wireless network;
   (c) informing the second wireless access unit within the second wireless network of the registering the at least one communication device;
   (d) configuring a first wireless access unit antenna array weighting factor; and
   (e) transmitting the first wireless access unit antenna array weighting factor to the second wireless access unit to adjust a second wireless access unit antenna array weighting factor based on the first wireless access unit antenna array weighting factor.

14. The method of claim 13, further comprising:
   (f) optimizing the first wireless network antenna array weighting factor based upon a location of the communications device.

15. The method of claim 13, wherein registering the at least one communications device is initiated by the first wireless network.

16. A method of sustaining coverage between wireless access units in a wireless network, the method comprising:
   (a) communicating by at least one wireless access unit with at least one other wireless access unit in the wireless network about at least one communication device;
   (b) establishing a hierarchy among the wireless access units for the at least one communication device;
   (c) determining a communication failure from at least one of the other wireless access units; and
   (d) adjusting a first antenna array weighting factor of the at least one wireless access unit based upon the hierarchy in response to the communication failure and based on a second antenna array weighting factor received from at least one of the other wireless access units.

17. The method of claim 16, further comprising:
   (e) re-establishing communications with the at least one other wireless access unit;
   (f) determining a location of the at least one communication device on the wireless network;
   (g) establishing a new hierarchy among the at least one other wireless access unit based upon the location of the at least one communication device; and
   (h) adjusting antenna array weighting factors of the wireless access units based upon the new hierarchy.

18. A method of providing signal coverage in a first wireless network, the method comprising:
   (a) establishing cooperative communications between a first wireless access unit and a second wireless access unit in the first wireless network to initialize a first wireless access unit weighting factor and a second wireless access unit weighting factor, wherein a first radiation pattern produced by first antenna elements of the first wireless access unit is based on the first wireless access unit weighting factor, and a second radiation pattern produced by second antenna elements of the second wireless access unit is based on the second wireless access unit weighting factor;
   (b) modifying the first wireless access unit weighting factor to provide an optimal signal coverage in response to an interaction with a communications device, wherein modifying the first wireless access unit weighting factor occurs if the first wireless access unit provides the communications device with a signal stronger than the second wireless access unit;
   (c) transmitting the modified first wireless access unit weighting factor to the second wireless access unit; and
   (d) modifying the second wireless access unit weighting factor based on the modified first wireless access unit antenna array weighting factor to provide the communications device with a cognizable signal and to reduce signal overlap with the first wireless access unit.

* * * * *